Patented Nov. 17, 1931

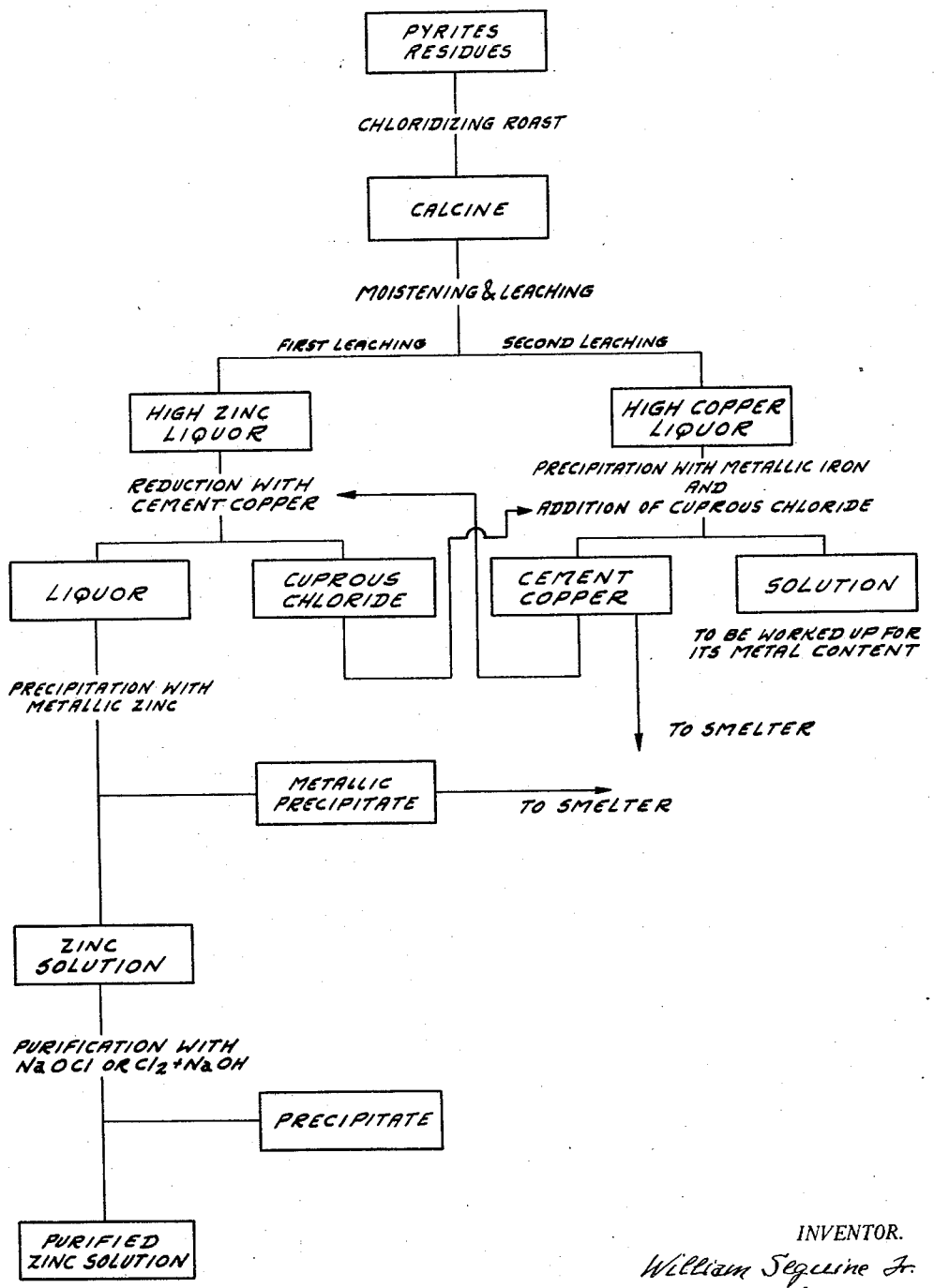

1,832,329

UNITED STATES PATENT OFFICE

WILLIAM SEGUINE, JR., OF NEWPORT, DELAWARE, ASSIGNOR, BY MESNE ASSIGNMENTS, TO KREBS PIGMENT & COLOR CORPORATION, OF WILMINGTON, DELAWARE, A CORPORATION OF DELAWARE

METHOD OF PURIFICATION OF ZINC SOLUTIONS

Application filed September 21, 1929. Serial No. 394,379.

This invention relates to the purification of zinc solutions. More particularly it relates to the purification of zinc solutions extracted from pyrites containing impurities. The utility of such zinc solutions in the lithopone art has been recognized, but the use of solutions extracted from pyrites has been attended with the difficulty that particularly nickel and iron are contained as impurities and their removal necessitates a process or processes so expensive as to be uneconomical.

This invention has as an object a method of purifying zinc solutions inexpensively. A further object is the development of a technique of operations such that the precipitate from various steps of the process may be used to carry out the precipitation essential to other steps of the process. Other objects will appear as the description proceeds.

In the practice of my invention the pyrites residue or cinder is mixed with salt and subjected to a chloridizing roast. The resulting calcine is moistened and the moistened calcine sent to a leaching tank to be leached with water, or with a weak acid such, for example, as hydrochloric, and/or sulfuric. Moistening the calcine before sending it to the leaching tank has this desirable result that the first part of the leaching process, which will hereafter be called the "high zinc" solution, may contain more than 80% of zinc and a low percentage of copper, and that the second part of the leaching solution contains a high percentage of copper and a low percentage of zinc. These solutions are collected separately and are separately stored. These solutions from the leaching process contain beside zinc chloride, or zinc sulfate, sodium chloride, sodium sulfate, copper chloride, copper sulfate and contaminations of iron, manganese, cobalt, nickel, lead, cadmium, silver and such other soluble materials as the pyrites contained.

The "high copper" solution is run to a precipitating drum which contains scrap iron and a substance, cuprous chloride, to be described later, which is added from the filter press step of the treatment of the "high zinc" solution. The scrap iron precipitates the copper from the solution as metallic copper mixed with such precipitates as silver. The solution is filtered from the precipitate and is worked for its metals in any known way. The precipitate, which in the art is known as cement copper, is divided, part is taken to a smelter and part is added to the treatment of the "high zinc" solution as described below.

The "high zinc" solution contains a certain percentage of copper, mainly as cupric chloride. In order to remove this copper the cupric chloride is reduced to cuprous chloride. This reduction is carried on in a tank containing that part of the cement copper which was separated from the precipitating drum in the treatment of the low zinc. The bulk of the cupric choride is converted to cuprous chloride, is precipitated and separated in a filter press. The cuprous chloride precipitated is then added to the precipitating drum of the "low zinc" process as described above. The cuprous chloride, however, is partially soluble in these solutions and cannot be entirely precipitated. It is necessary, therefore, to precipitate the residue copper with zinc.

After the removal of the bulk of the copper the solution from the filter press is run to a precipitating drum in which scrap zinc is placed. With this process the nickel, copper, silver, cadmium, lead and some of the cobalt separate out in the cold, and are filtered off and sent to the smelter. The purified zinc solution is stored and later used in those processes for which it is suitable, such, for example, as in the manufacture of lithopone.

If it is desired to clean the solution of such impurities as iron, manganese and cobalt, the solution is treated with a reagent such as hypochlorite of soda or lime, or with chlorine gas in the presence of an appropriate hydrolyzing base. The result is a pure solution of zinc sulfate, and/or chloride, with sodium chloride, which is suitable for the precipitation of lithopone with barium sulfide or the production of zinc hydrate by methods well known to those skilled in the art.

In the practice of the invention a solution "B", was made by a prior art process and a solution "A" was made by my process. It will be observed that the prior art process showed a distinct percentage of nickel and a high percentage of iron, whereas the solution treated by my process showed no nickel and a quantity of iron so insignificant as to produce no effect.

*Grams per liter*

|  | A | B |
|---|---|---|
| Zinc | 75 | 75 |
| Iron | 1.0 | 12.0 |
| Nickel | None | .09 |
| Lead<br>Copper<br>Cadmium | None | Traces |

Some of the advantages of the invention are that nickel and other metallic impurities are eliminated from the zinc solution without heat or the use of expensive zinc dust, that iron is not used as a reagent in purifying the zinc solution and that the zinc solution consequently is uncontaminated by iron that would have been introduced by the iron reagent, that the reagents used in the first precipitating steps of the process are formed in the process itself.

Instead of separating the high zinc solution from the high copper solution the copper reduction may be carried out in these united solutions, the cuprous chloride may be treated with iron and the precipitated copper used to reduce the copper in the united solutions.

As many apparently widely different embodiments of this invention may be made without departing from the spirit and scope thereof, it is to be understood that I do not limit myself to the specific embodiments thereof except as defined in the appended claims.

I claim:

1. In a method of recovering a zinc solution from a zinciferous material containing water and acid soluble copper and other heavy metal compounds, in which at least part of the metals are present as chlorides, the steps which comprise leaching said material with an aqueous lixiviant in an amount sufficient to dissolve a majority of the zinc content of said material, but insufficient to dissolve more than a fraction of its copper content, producing thereby a high zinc solution, then leaching the residue with additional amounts of an aqueous lixiviant, dissolving thereby the remainder of the copper and producing a high copper solution, treating the high copper solution with metallic iron, precipitating thereby cement copper from said high copper solution, adding so obtained cement copper to said high zinc solution, precipitating thereby its copper content as cuprous chloride and separating the zinc liquor from said precipitate of cuprous chloride.

2. The process of claim 1 when applied to chloridized roasted, copper containing pyrites cinders.

3. In a method of recovering a zinc solution from a zinciferous material containing water and acid soluble copper and other heavy metal compounds, in which at least part of the metals are present as chlorides, the steps which comprise leaching said material with an aqueous lixiviant in an amount sufficient to dissolve a majority of the zinc content of said material, but insufficient to dissolve more than a fraction of its copper content, producing thereby a high zinc solution, then leaching the residue with additional amounts of an aqueous lixiviant, dissolving thereby the remainder of the copper and producing a high copper solution, treating the high copper solution with metallic iron, precipitating thereby cement copper from said high copper solution, adding so obtained cement copper to said high zinc solution, precipitating thereby its copper content as cuprous chloride, and recovering the copper content of said cuprous chloride by adding it to a subsequent high copper solution and treating it therein with metallic iron.

4. The process of claim 3 when applied to chloridized roasted, copper containing pyrites cinders.

5. In a method of recovering a substantially pure zinc solution from a zinciferous material containing water and acid soluble copper and other heavy metal compounds, such as nickel and iron, etc., in which at least part of the metals are present as chlorides, the steps which comprise leaching said material with an aqueous lixiviant in an amount sufficient to dissolve a majority of the zinc content of said material, but insufficient to dissolve more than a fraction of its copper content, producing thereby a high zinc solution, then leaching the residue with additional amounts of an aqueous lixiviant, dissolving thereby the remainder of the copper and producing a high copper solution, treating the high copper solution with metallic iron, precipitating thereby cement copper from said high copper solution, adding so obtained cement copper to said high zinc solution, precipitating thereby most of its copper content as cuprous chloride, separating the zinc liquor from said precipitate of cuprous chloride, recovering the copper content of said cuprous chloride by adding it to a subsequent high copper solution and treating it therein with metallic iron, treating said zinc liquor freed from cuprous chloride in the cold with metallic zinc, separating said zinc liquor from the precipitated metals, then treating said zinc liquor by the joint action of chlorine and an alkali, thereby precipitating heavy metals in the form of hydroxides, and separating the purified zinc liquor from said precipitate of hydroxides.

6. The process of claim 5 when applied to chloridized roasted, copper containing pyrites cinders.

In testimony whereof, I affix my signature.

WILLIAM SEGUINE, Jr.